(12) United States Patent
Christensen et al.

(10) Patent No.: US 8,702,550 B1
(45) Date of Patent: Apr. 22, 2014

(54) AIRCRAFT ELECTRIC TAXI SYSTEM WITH FRICTION ACTUATED, BI-DIRECTIONAL CLUTCH

(71) Applicant: Honeywell International, Inc., Morristown, NJ (US)

(72) Inventors: Donald J. Christensen, Phoenix, AZ (US); Todd Langston, Chandler, AZ (US); David Lane Charles, South Bend, IN (US); Rudy Velasquez, El Mirage, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 13/945,828

(22) Filed: Jul. 18, 2013

Related U.S. Application Data

(62) Division of application No. 12/950,874, filed on Nov. 19, 2010, now Pat. No. 8,617,019.

(51) Int. Cl.
*F16H 48/06* (2006.01)

(52) U.S. Cl.
USPC .............................................. 475/154; 475/5

(58) Field of Classification Search
USPC ........... 475/149, 154, 258, 331; 192/35, 54.1, 192/103 R
See application file for complete search history.

(56) References Cited

U.S. PATENT DOCUMENTS

| | | | |
|---|---|---|---|
| 2,148,481 A | 2/1939 | Le Frank | |
| 2,514,460 A * | 7/1950 | Tucker | 310/67 R |
| 3,734,252 A | 5/1973 | Ahlen | |
| 3,812,928 A * | 5/1974 | Rockwell et al. | 180/65.51 |
| 4,579,205 A | 4/1986 | Post | |
| 4,659,039 A | 4/1987 | Valdes | |
| 5,679,087 A * | 10/1997 | Lutz | 475/149 |
| 5,927,455 A | 7/1999 | Baker | |
| 6,093,125 A | 7/2000 | McCarrick | |
| 6,244,965 B1 | 6/2001 | Klecker | |
| 6,974,015 B2 | 12/2005 | Gamache | |
| 6,974,399 B2 * | 12/2005 | Lo | 475/5 |
| 6,997,831 B2 | 2/2006 | Kanda | |
| 7,029,417 B2 | 4/2006 | Borgerson | |
| 7,258,214 B2 | 8/2007 | Pawley | |
| 7,473,202 B2 | 1/2009 | Morscheck | |
| 7,621,835 B2 * | 11/2009 | Oshidari | 475/5 |
| 7,992,695 B2 | 8/2011 | Wittkopp | |
| 8,137,231 B2 * | 3/2012 | Lin | 475/258 |

(Continued)

FOREIGN PATENT DOCUMENTS

DE 20 2008 002977 U1 10/2008

OTHER PUBLICATIONS

European Search Report, Dated Feb. 22, 2012, EP 11 18 9374.
Torq-Lok One-way Bi-Directional Clutch, Dec. 3, 2009.

*Primary Examiner* — Justin Holmes
(74) *Attorney, Agent, or Firm* — Shimokaji & Associates, P.C.

(57) ABSTRACT

An electric taxi system (ETS) for an aircraft may comprise drive motors mounted coaxially with wheels of the aircraft. A clutch assembly may be interposed between the drive motor the wheel. The clutch assembly may transmit torque from the motor to the wheel when the wheel and a rotor of the motor rotate at the same rotational speed. The clutch assembly may self-disengage a rotor of the motor from the wheel when the wheel rotates faster than the rotor.

6 Claims, 10 Drawing Sheets

(56) References Cited

U.S. PATENT DOCUMENTS

| | | |
|---|---|---|
| 8,231,492 B2 | 7/2012 | Chen |
| 2008/0070736 A1* | 3/2008 | Yoshino et al. ............... 475/149 |
| 2008/0169165 A1 | 7/2008 | Samie |
| 2010/0300782 A1* | 12/2010 | Walter et al. ............... 180/65.51 |
| 2010/0326748 A1* | 12/2010 | Sgherri et al. .................. 180/55 |
| 2011/0130238 A1* | 6/2011 | Schoon ......................... 475/154 |

* cited by examiner

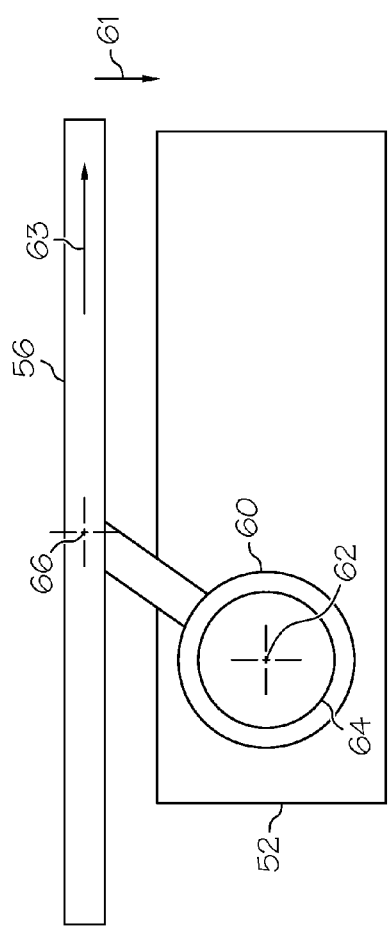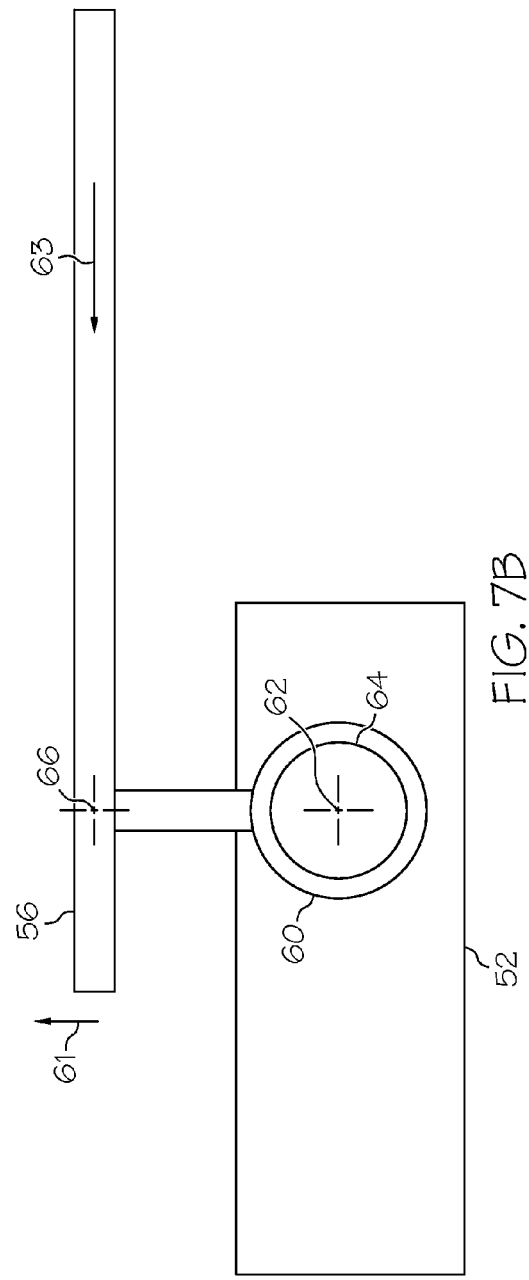

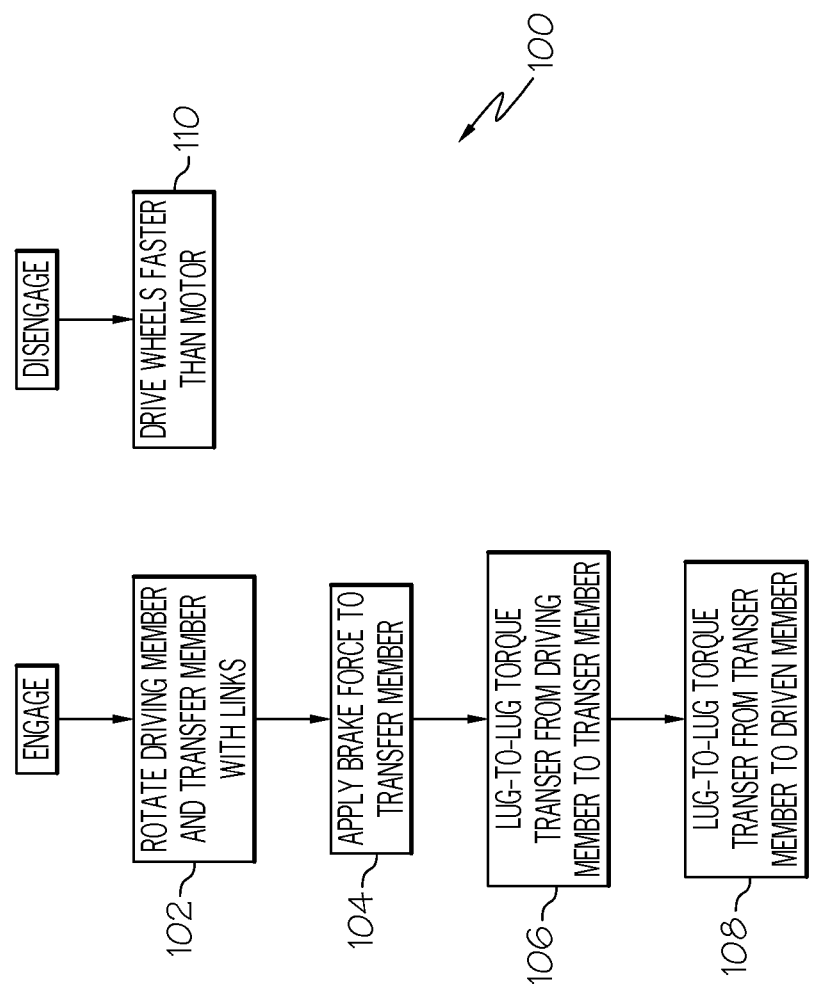

AIRCRAFT ELECTRIC TAXI SYSTEM WITH FRICTION ACTUATED, BI-DIRECTIONAL CLUTCH

RELATED APPLICATIONS

This application is a Divisional Application of U.S. application Ser. No. 12/950,874 filed Nov. 19, 2010.

BACKGROUND OF THE INVENTION

The present invention generally relates to aircraft landing gear. More particularly, the invention relates to landing gear with integrated electric drive systems to propel an aircraft during taxiing.

A typical aircraft may taxi to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Electric taxi systems (ETS) have been proposed to provide higher efficiency. An ETS may be implemented by using electrical motors to provide the motive force for aircraft taxiing. While this general ETS concept holds promise for improved efficiency, there are practical application problems that need to be addressed in any successful ETS design. For example, it is desirable that an ETS should be selectively engageable with wheels of the aircraft so that the ETS does not impact normal take-off and landing procedures or aircraft performance. It is also desirable to construct an ETS with compact and lightweight components which may perform reliably even when exposed to varying environmental conditions that may be encountered by the aircraft at various airports.

As can be seen, there is a need for a selectively engageable ETS which may not adversely normal take-off and landing procedures or aircraft performance. In that regard, it would be desirable to construct an ETS with a self-disengaging clutch interposed between an electric motor and an aircraft wheel. More particularly, there is a need for a self-disengaging clutch for such an ETS which may be compact in size and which may operate reliably under widely varying environmental conditions.

SUMMARY OF THE INVENTION

In one aspect of the present invention, an electric taxi system (ETS) for an aircraft may comprise a drive motor mounted coaxially with a wheel of the aircraft; a clutch assembly interposed between the drive motor the wheel; the clutch assembly being configured to transmit torque from the motor to the wheel when the wheel and a rotor of the motor rotate at the same rotational speed; the clutch assembly being configured to disengage the rotor from the wheel when the wheel rotates faster than the rotor.

In another aspect of the present invention, a clutch assembly may comprise: a driving member; a driven member; and a transfer member axially movable between a retracted position and an extended position; the transfer member being coupled to the driving member with one or more links when the transfer member is in its retracted position so that the transfer member is driven to rotate with the driving member as a result of force transmitted through the links; the transfer member configured to engage with a driving lug of the driving member when the transfer member is in its extended position so that the transfer member is driven to rotate with the driving member as a result of force transmitted through the driving lug; the transfer member being configured to engage with a driven lug of the driven member to rotate the driven member when the transfer member is in its extended position; and the transfer member being disengaged from the driven member when the transfer member is in its retracted position.

In still another aspect of the present invention, a method for selectively applying torque to a wheel of an aircraft: wherein application of torque may comprise the steps of rotating a driving member with a motor while applying spring force to a transfer member; releasing the transfer member from a locked position to allow the transfer member to engage with a driven member; rotating the transfer member with lug-to-lug torque transfer from the driving member; and rotating a driven member attached to the wheel with lug-to-lug torque transfer from the transfer member; and wherein cessation of torque application comprises the step of applying a braking force to the transfer member to disengage the transfer member from the driven member.

These and other features, aspects and advantages of the present invention will become better understood with reference to the following drawings, description and claims.

BRIEF DESCRIPTION OF THE DRAWINGS

FIG. 7A is a diagram illustrating an operational arrangement of the elements of the clutch assembly shown in FIG. 4 showing a transfer member in an extended position is in accordance with an embodiment of the invention;

FIG. 7B is a diagram illustrating an operational arrangement of the elements of the clutch assembly shown in FIG. 4 showing a transfer member in a retracted position is in accordance with an embodiment of the invention;

FIG. 10 is a flow chart of a method for selectively applying torque to a wheel of an aircraft in accordance with an embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an ETS for an aircraft. The ETS may employ a selectively engageable clutch interposed between an electric motor and a landing-gear wheel. The clutch may be capable of self-disengagement when wheel speed exceeds driving speed of the electric motor.

Figure 1:
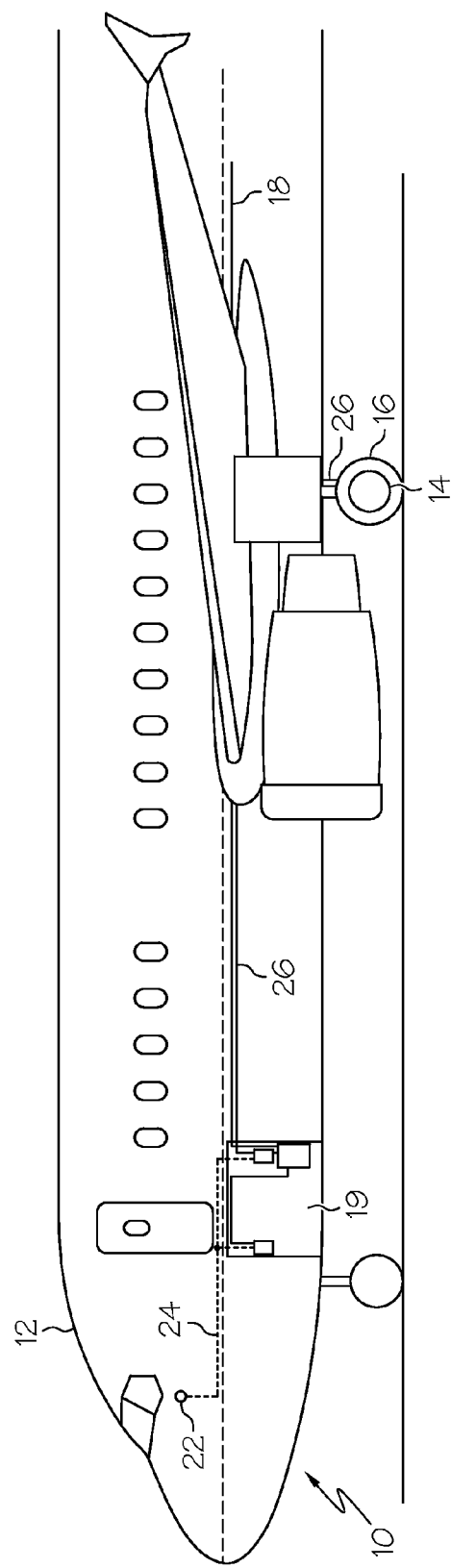
FIG. 1 is a schematic diagram of an electric taxi system (ETS) in accordance with an embodiment of the invention.

Referring now to FIG. 1, an exemplary embodiment of an ETS 10 which may be installed in an aircraft 12 is shown in schematic form. The system 10 may comprise electric drive units 14 mounted on axles of wheels 16. A power feed 18 may carry power to an ETS power distribution unit 19. A pilot interface unit 22 may be connected to the ETS power distribution unit 19 through an interface cable 24. Upon appropriate commands from a pilot, electric power may be transmitted to the electric drive units 14 through an ETS feeder 26.

Figure 2:
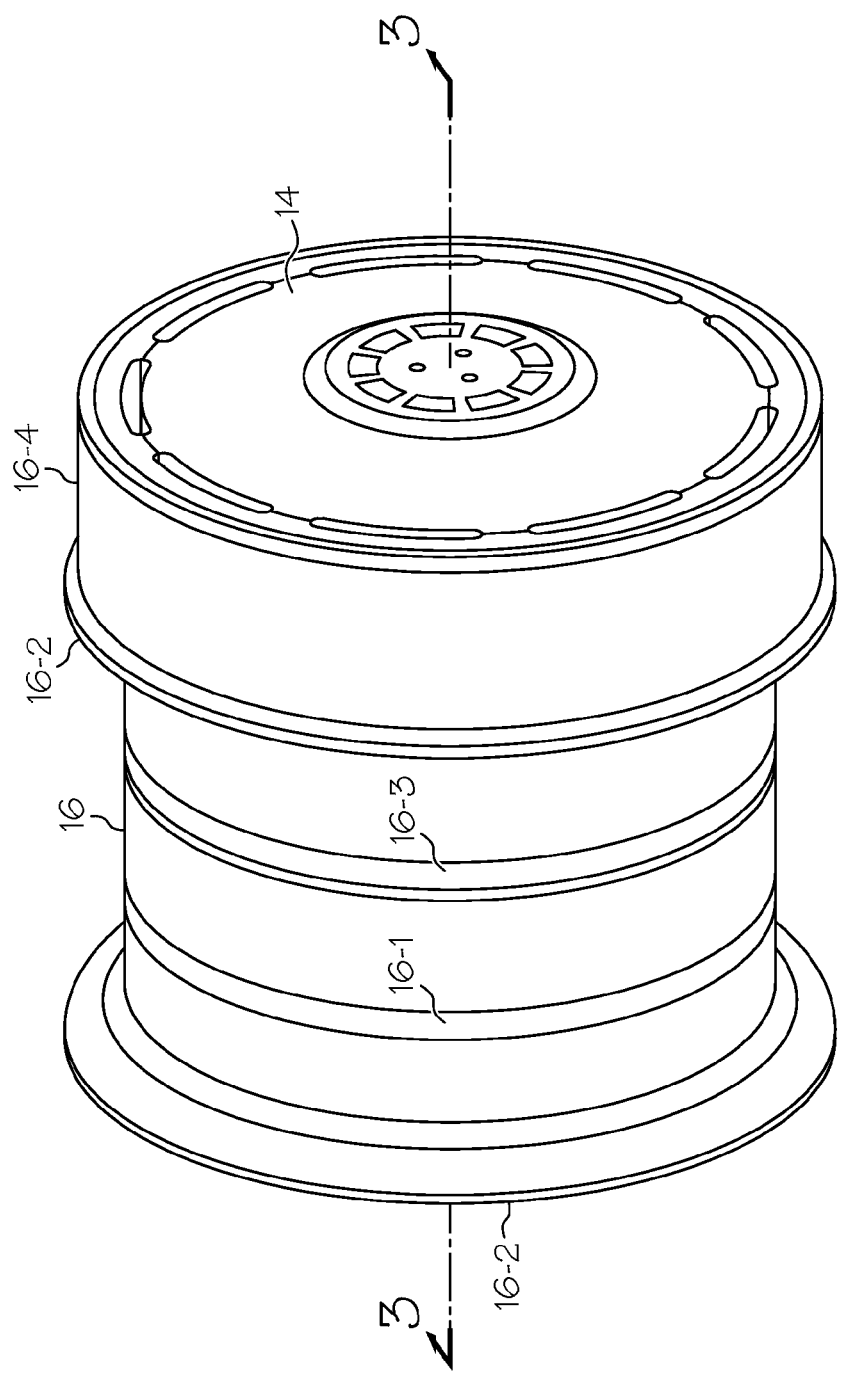
FIG. 2 is a perspective view of a wheel of an aircraft having an attached drive unit in accordance with an embodiment of the invention.

Referring now to FIG. 2, an outboard one of the wheels 16 is shown. For purposes of clarity, the wheel 16 is shown without a tire. The wheel 16 may comprise a hub 16-1 and rims 16-2. In an exemplary embodiment of the invention, the wheel 16 may have a split-hub configuration. The wheel 16 may have a split line 16-3 along which the wheel 16 may be separated for purposes of installing and removing tires. The drive unit 14 may be mounted adjacent an outboard one of the rims 16-2 and coaxially with the wheel 16. Advantageously, the drive unit 14 may have an outside diameter that is no larger than an outside diameter of the rim 16-2.

Figure 3:
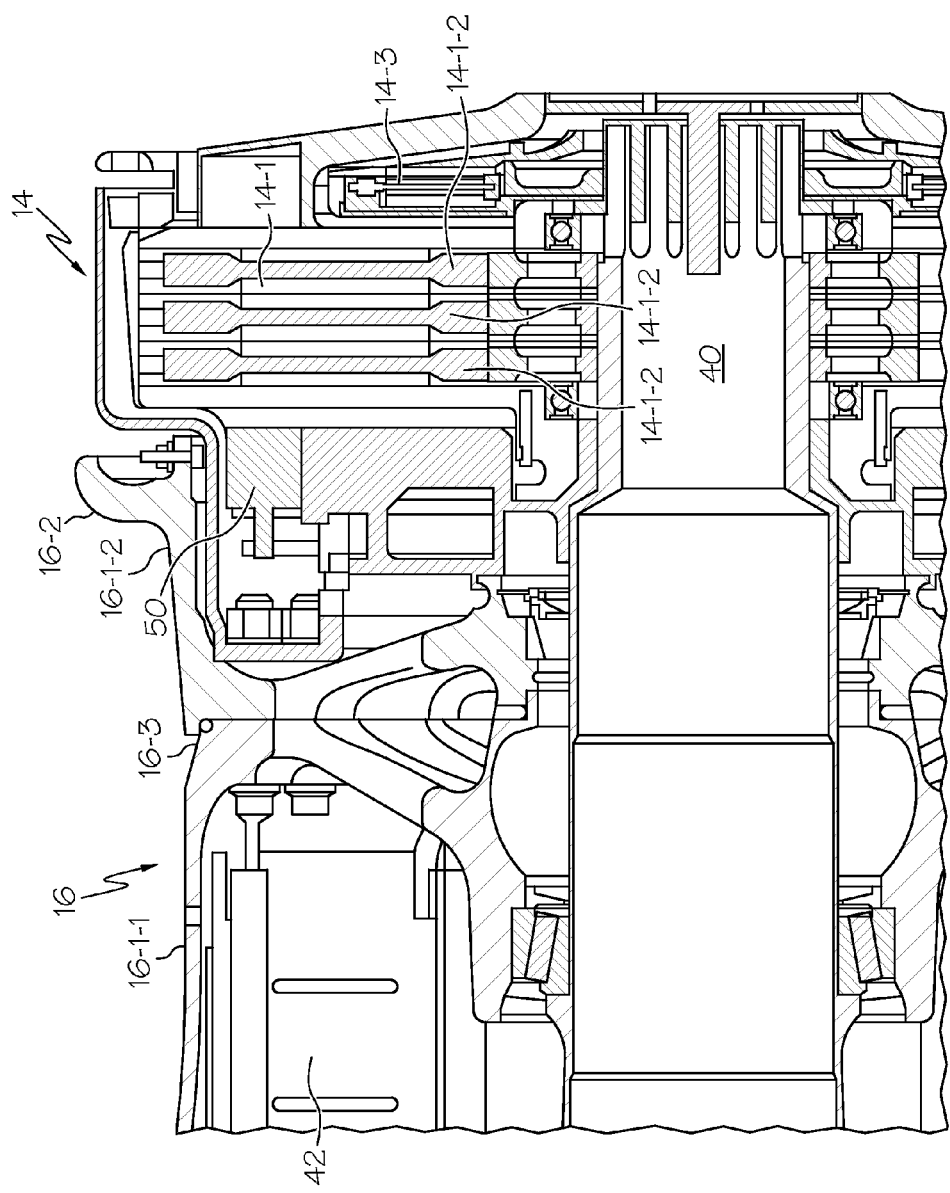
FIG. 3 is a partial sectional view of the wheel and drive unit of FIG. 2 in accordance with an embodiment of the invention.

Referring now to FIG. 3, a partial cross-sectional view of the wheel 16 may illustrate various inventive features of the drive unit 14. The drive unit 14 may comprise a drive motor 14-1 supported concentrically with a wheel axle 40. In that regard, the drive motor 14-1 may be considered to be a wheel-mounted drive motor. Advantageously, the drive motor 14-1 may be a Segmented ElectroMagnetic Array (SEMA) motor. A rotor 14-1-1 of the drive motor 14-1 may be adapted to rotate around the wheel axle 40.

A selectively-engageable clutch assembly 50 may be interposed between the rotor 14-1-1 and the wheel 16. In other words, the wheel 16 may be driven by the drive motor 14-1 when the clutch assembly 50 may be engaged. Conversely, when the clutch assembly 50 may be disengaged, the wheel 16 and the rotor 14-1-1 may be rotatable independently of one another.

In an exemplary embodiment, the wheel 16 may have a first hub portion 16-1-1 and a second hub portion 16-1-2. The split line 16-3 may define a location at which the two hub portions 16-1-1 and 16-1-2 may be separated. In FIG. 3, the first hub portion 16-1-1 may be shown at a left side of the split line 16-3 and the second hub portion 16-1-2 may be shown at a right side of the split line 16-3. A brake assembly 42 may be incorporated into the hub portion 16-1-1. The clutch assembly 50 may be located in the second hub portion 16-1-2. The motor 14-1 may be located outside of the second hub portion 16-1-2 and adjacent the rim 16-2.

The relative positions of the motor 14-1, the brake assembly 42 and the clutch assembly 50 may be advantageous for a number of reasons. First of all, the brake assembly 42 may be located in the wheel 16 at a location that is consistent with conventional locations of brake assemblies in many conventional wheels of existing aircraft. Consequently, such conventional wheels may be retro-fitted for ETS operation without reconfiguration of their brake assemblies.

Secondly, conventional aircraft wheels typically have a hollow chamber in their outboard hub portion. In the present embodiment of the invention, the clutch assembly 50 may be internally positioned in this otherwise hollow hub portion (i.e., the second hub portion 16-1-2). This arrangement provides for a reduced axial projection of the drive unit 14. In other words, the drive unit 14 may extend only a limited axial distance beyond the rim 16-2. In this regard, it may be advantageous to position the drive units 14 in outboard ones of the wheels 16. When the wheels 16 are retracted after takeoff, the drive units 14 may be oriented in a downward position. As a consequence, an aircraft may be easily retrofitted with the inventive ETS because only a limited modification to landing gear doors (not shown) may be needed to accommodate minimally extending drive units 14.

Figure 4:
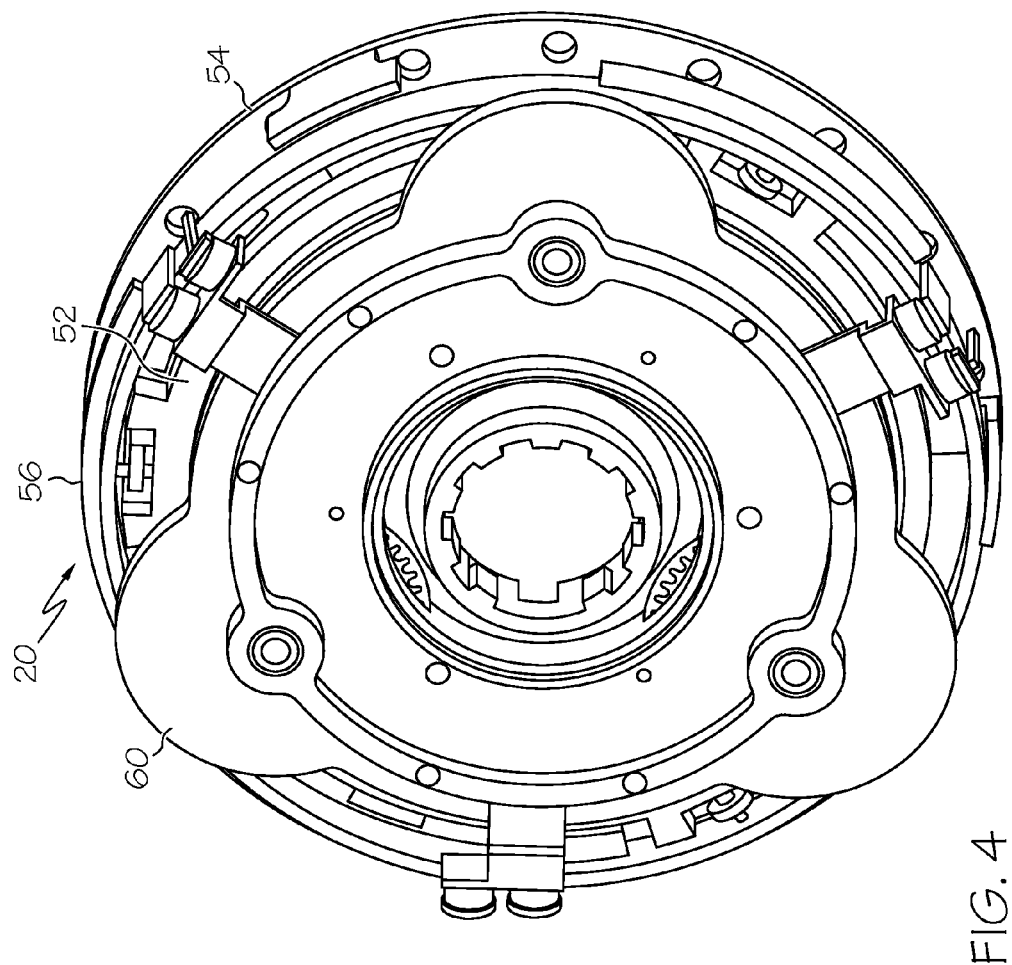
FIG. 4 is perspective view of a clutch assembly in accordance with an embodiment of the invention.
Figure 5:
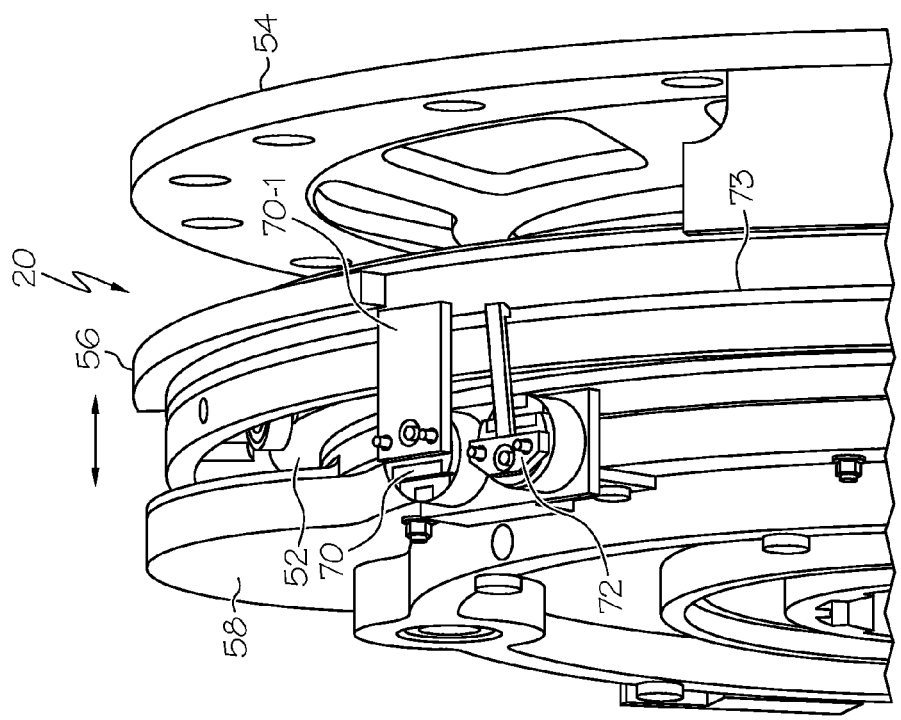
FIG. 5 is top perspective view of the clutch assembly of FIG. 4 in accordance with an embodiment of the invention.

Referring now to FIGS. 4 and 5, the clutch assembly 50 may be seen to comprise a driving member 52, a driven member 54 and a transfer member 56. In an exemplary embodiment of the clutch assembly 50, the driving member 52 may be a ring gear that may be driven through a planetary gear drive train 58 or any other output stage of a motor driven gearbox, connected to the rotor 14-1-1 of the motor 14-1 of FIG. 3. The driven member 54 may be directly connected to the wheel hub 16-1 of FIG. 3.

The driving member 52 and the driven member 54 may have fixed axial positions along axes of the wheel 16 and the drive unit 14. The transfer member 56 may be axially movable relative to the driving member 52 and the driven member 54.

In operation, the driving member or ring gear 52 may continuously rotate whenever the drive motor rotor 14-1-1 may rotate. The transfer member 56 may be configured (as with be explained hereinafter) to rotate with the ring gear 52. The transfer member 56 may be considered to be in a retracted position when it is axially positioned to be disengaged from the driven member 54. Conversely, the transfer member 56 may be considered to be in an extended position when it may be engaged with the driven member 54. In the extended position, the transfer member 56 may transfer torque force from the ring gear 52 to the driven member 56 (i.e., from the motor 14-1 to the wheel 16).

Figure 6:
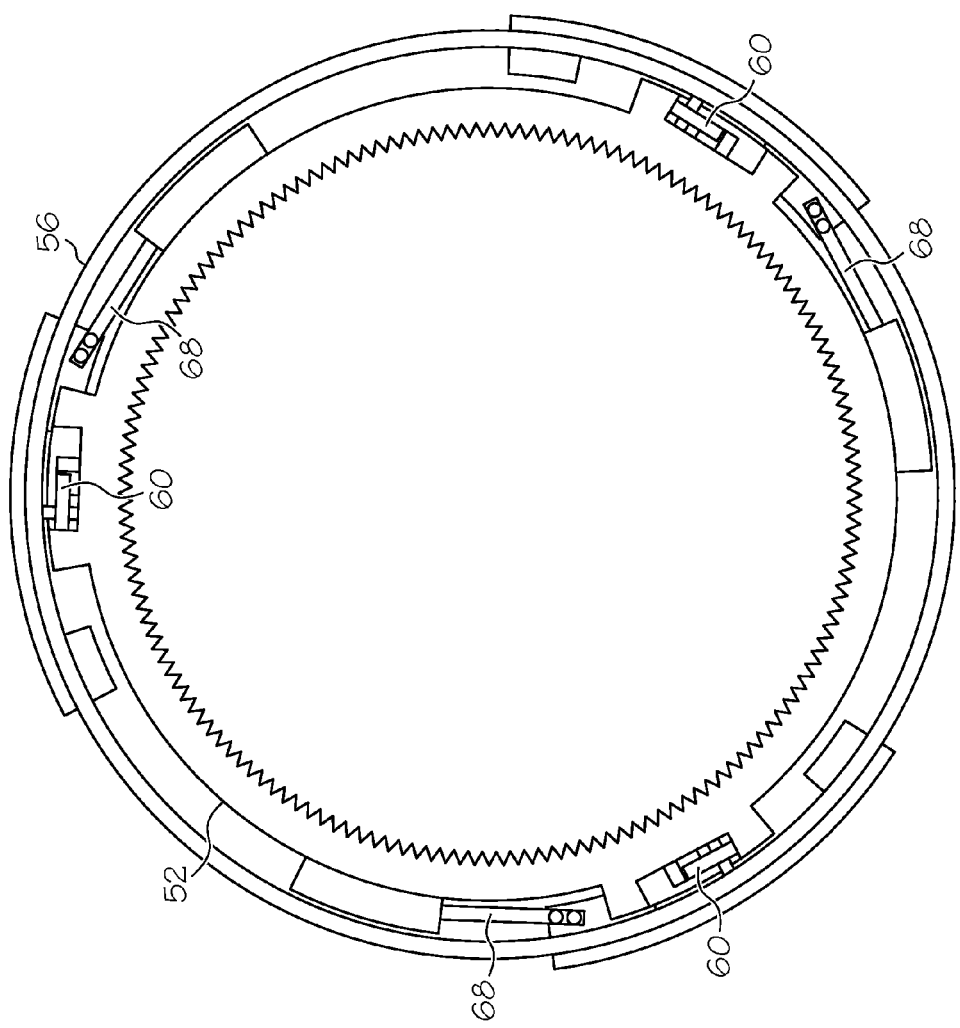
FIG. 6 is a partial sectional view of the clutch assembly of FIG. 4 in accordance with an embodiment of the invention.

Referring now to FIGS. 6, 7A and 7B, it may be seen that the ring gear 52 may be interconnected with the transfer member 56 with actuation links 60. In an exemplary embodiment of the clutch assembly 50 three of the links may disposed uniformly around the ring gear 52 so that a plane of the ring gear and a plane of the transfer member 56 may remain parallel to one another. As the ring gear 52 rotates, the links 60 may produce corresponding rotation of the transfer member 56. FIGS. 7A and 7B, illustrates how the links 60 may produce axial movement of the transfer member 56 (i.e., in a direction of arrow 61) when the transfer member 56 may translated circumferentially relative to the ring gear 52 (i.e., in a direction of arrow 63). The link 60 may be attached to the ring gear 52 at a driving-member pivot point 62. The link 60 may also be attached to the transfer member 56 at a transfer-member pivot point 66. It may be seen that if the transfer member 56 is circumferentially displaced relative to the ring gear 52, then an axial distance between the pivot points 62 and 66 may also change. As the axial distance may be increased, the transfer member 56 may be moved to its extended position. It may be noted that movement of the pivot points 62 and 66 relative to one another may take place on a path that may be three-dimensional or helical. Advantageously, the link 60 may be attached to the ring gear 52 with a spherical bearing 64 to accommodate the link 60 such a motion path.

Leaf springs 68 may be attached to the transfer member 56 at their fixed ends 68-1. The leaf springs may bear against the ring gear 52 at their free ends. The leaf springs 68 may be configured so they produce force in a direction that urges the transfer member 56 into its retracted position. In other words, spring force of the leaf springs 68 must be overcome before that transfer member 56 may move axially from its retracted position to its extended position.

Referring back now to FIG. 5, it may be seen how the transfer member 56 may be selectively moved between its retracted and extended positions. In an exemplary embodiment, a solenoid operated brake assembly 70 may be attached to the planetary gear train 58 or any other static structure. A brake pad 70-1 may be selectively urged into contact with the transfer member 56. When the brake pad makes contact with the transfer member 56, the transfer member 56 may briefly rotate more slowly than the ring gear 52. This brief differential in rotational speed may result in circumferential translation of the transfer member 56 relative to the ring gear 52. As described above with respect to FIGS. 7A and 7B, the links 60 may change their angular position into an extended mode, overcoming the spring force of the leaf springs 68, and the transfer member 56 may be moved to its engaged position. If alignment of the drive lugs is not immediately available, the drive and driven lugs may abut. With the brake remaining engaged and with drive speed commanded to be slightly faster than the driven, opening for the drive lug may quickly appear and the torque connection may be completed. At this point the transfer of torque between lugs is sufficient to maintain engagement and the brake is no longer needed.

Upon release of torque load from the transfer member 56, the leaf springs 68 may urge the transfer member 56 into its retracted position. The links 60 may move correspondingly into a retracted mode. A solenoid operated lock 72 may be engaged with a lock groove 73 formed in an outer surface of the transfer member 56. The lock 72 may hold the transfer member 56 in its retracted position even if the clutch assembly 50 may be subjected to jostling or vibration during taxiing of the aircraft.

Figure 8:
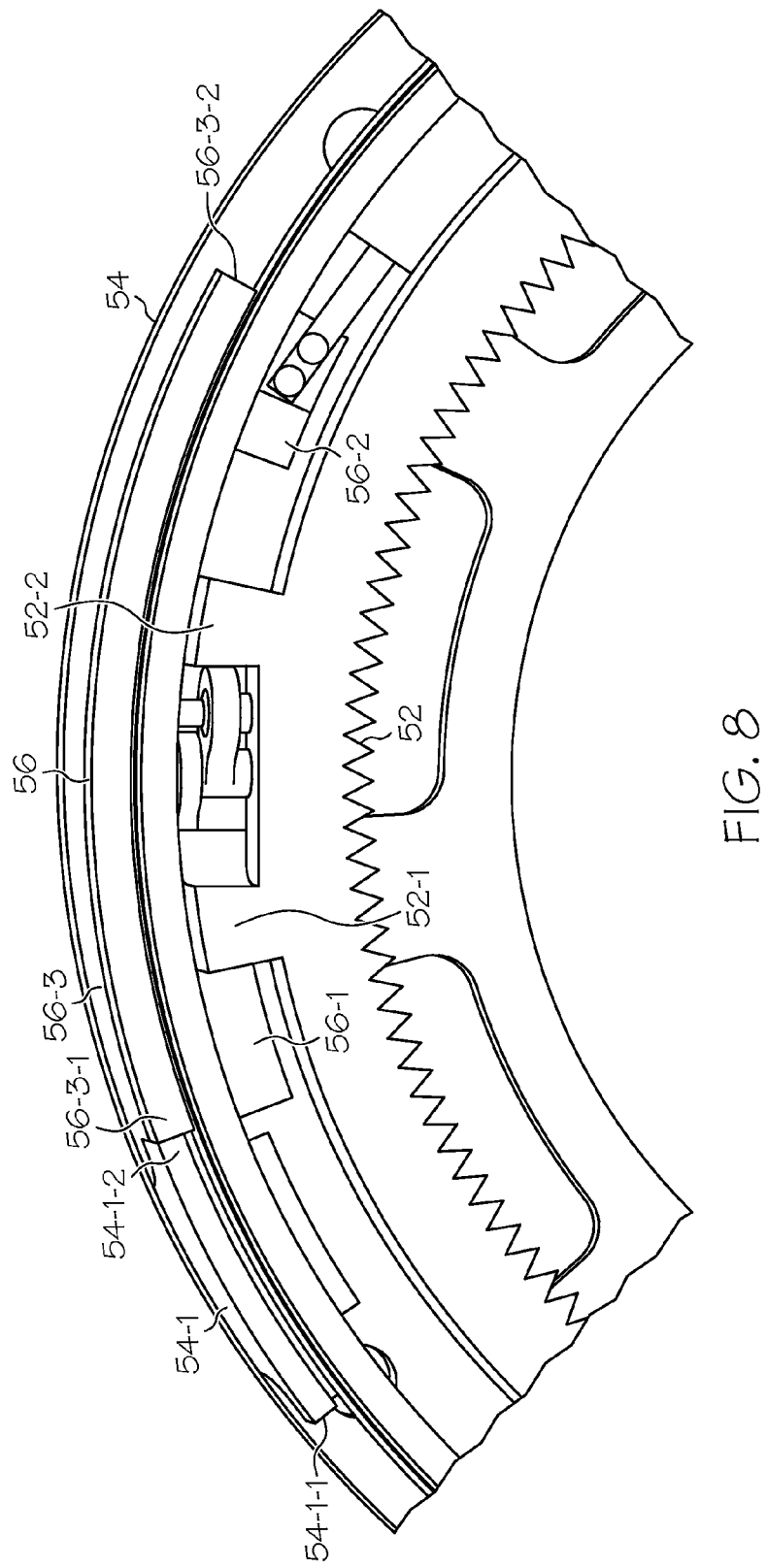
FIG. 8 is a perspective view of lug portions of the clutch assembly in a counterclockwise torque transmission mode in accordance with an embodiment of the invention.
Figure 9:
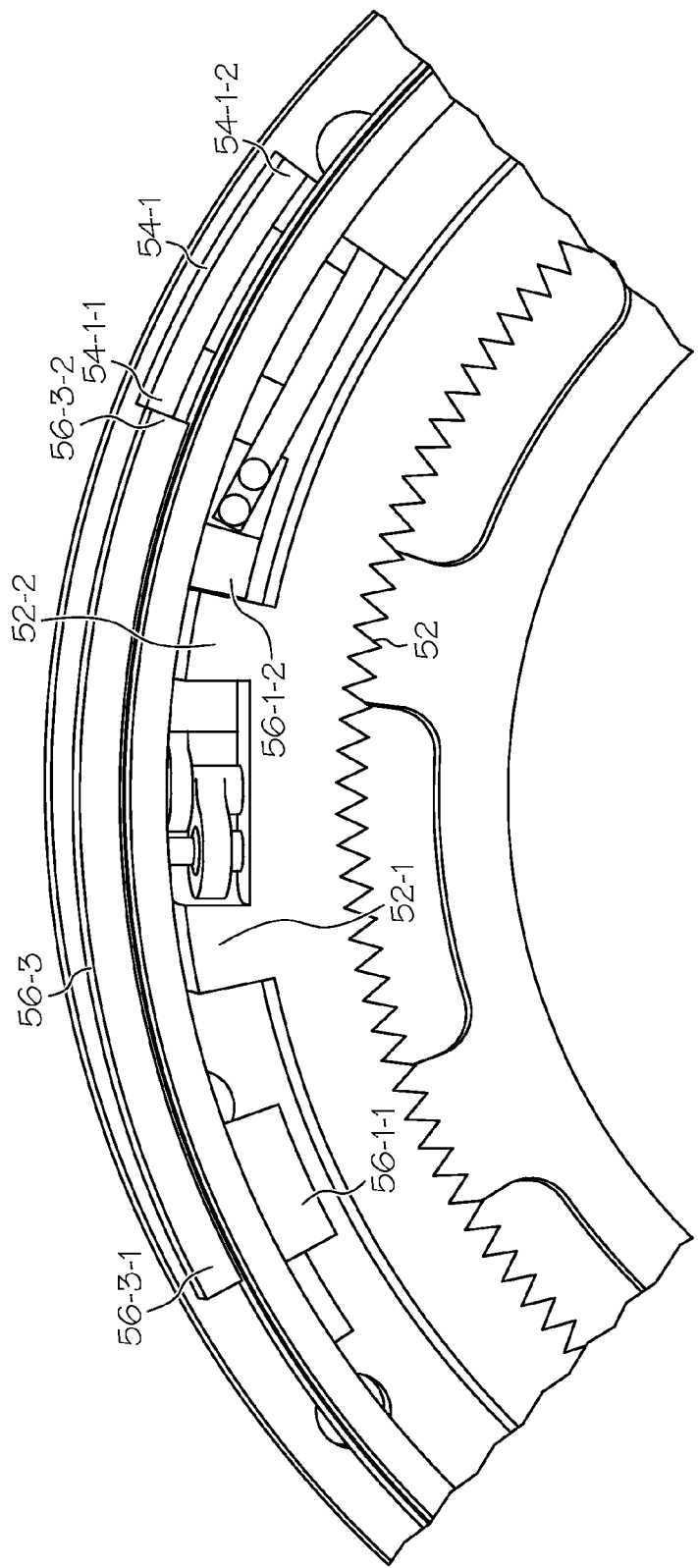
FIG. 9 is a perspective view of lug portions of the clutch assembly in a clockwise torque transmission mode in accordance with an embodiment of the invention.

Referring now to FIGS. 8 and 9, it may be seen how the transfer member 56 may provide torque force transmission from the ring gear 52 to the driven member 54. FIG. 8 illustrates a case in which the driven member 54 may be driven in a counterclockwise direction. FIG. 9 illustrates a case in which the driven member 54 may be driven in a clockwise direction.

The ring gear 52 may be provided with one or more sets of driving lug 52-1 and 52-1. The transfer member 56 may be provided with one or more sets of inner transfer lugs 56-1 and 56-2. As shown in FIG. 8, the counterclockwise transfer lug 56-1 may be engageable with the counterclockwise driving lug 52-1-1. As shown in FIG. 9, the clockwise transfer lug 56-2 may be engageable with the clockwise driving lug 52-2.

The transfer member 56 may also be provided with one or more outer lugs 56-3 having a counterclockwise side 56-3-1 and a clockwise side 56-3-1. The driven member 54 may be provided with one or more driven lugs 54-1 having a counterclockwise side 54-1-1 and a clockwise side 54-1-2. As shown in FIG. 8, the counterclockwise side 56-3-1 of the outer lug 56-3 may be engageable with the clockwise side 54-1-2 of the driven lug 54-1. As shown in FIG. 9, the clockwise side 56-3-2 of the outer lug 56-3 may be engageable with the counterclockwise side 54-1-1 of the driven lug 54-1.

When the transfer member 56 is in its extended position the outer lug 56-3 may engage with the driven lug 54-1. Thus torque from the ring gear 52 may be transmitted through the transfer member 56 and into the driven member 54. When the transfer member 56 is in its retracted position, the outer lug 56-3 may not engage with the driven lug 54-1 and the ring gear 52 may rotate independently from the driven member 54.

It may be noted that the clutch assembly 50 may advantageously disengage the motor 14-1 from the wheel 16 whenever the wheel may rotate faster than the motor 14-1. This may result from the transfer member 56 moving to its retracted position at any time that the driven member 54 may rotate faster than the ring gear 52. If the driven member 54 rotates faster than the ring gear 52, for example, in a counterclockwise direction, the counterclockwise side 54-1-1 of the driven lug 54-1 may be rotated into contact with the clockwise side 56-3-2 of the outer lug 56-3. This may result in circumferential translation of the transfer member 56 relative to the ring gear 52. This circumferential translation may result in the links 60 being shifted from their extended mode into their retracted mode. The spring force of the leaf springs 68 may move the transfer member 56 to its retracted position. Similar disengagement may occur if the wheel 16 may be rotating faster than the motor 14-1 in a clockwise direction.

This advantageous feature of the present invention may be useful to preclude overdriving of the motor 14-1 that could result in damage to the motor. Such an overdriving may occur, for example, when a pilot begins to propel the aircraft with engine power.

Referring now to FIG. 10, a flow chart may illustrate an exemplary method 100 for selectively applying torque to a wheel of an aircraft. Application of torque may comprise a step 102 in which a driving member may be rotated with a motor and a transfer member may be correspondingly rotated; a step 104 in which braking force may be applied to the transfer member to move the transfer member to engage with a driven member; a step 106 in which the transfer member may be rotated with lug-to-lug torque transfer from the driving member; and a step 108 in which a driven member attached to the wheel may be rotated with lug-to-lug torque transfer from the transfer member. Cessation of torque application may comprise a step 110 in which wheels of the aircraft may be driven faster than the motor to disengage the transfer member from the driven member.

Step 102, for example, may be performed by rotating the ring gear 52 with the motor 14-1 and driving the transfer member 56 through the links 60. Step 104 may be performed, for example, by actuating the lock assembly 72 to release it from the brake assembly 70 to apply braking force to the transfer member 56 and to produce circumferential translation of the transfer member 56 relative to the ring gear 52. Step 106 may be performed, for example, by engaging the ring-gear lug assembly 52-1 with the inner lug 56-1 of the transfer member 56 to transmit torque from the ring gear 52 to the transfer member 56. The step 108 may be performed, for example, by engaging the outer lug 56-2 of the transfer member 56 with the driven lug 54-1 of the driven member 54 to transmit torque from the transfer member 56 to the driven member 54.

Step 110 may be performed, for example, by overdriving the transfer member 56 to produce circumferential displacement between the transfer member 56 and the ring gear 52 so that the links 60 may rotate about their pivot points 62 and 66 and produce axial displacement of the transfer member 56 away from the driven member 54 so that the transfer member 56 may be disengaged from the driven member 54.

It should be understood, of course, that the foregoing relates to exemplary embodiments of the invention and that modifications may be made without departing from the spirit and scope of the invention as set forth in the following claims.

We claim:

1. A method for taxiing an aircraft with an electric taxi system (ETS) comprising the steps of:

driving a wheel-mounted electric motor at a determined motor driving speed in either a first rotational direction or a second rotational direction opposite the first rotational direction;

engaging a selectively engageable clutch to drive a wheel of the aircraft at a wheel speed that corresponds to the motor driving speed by transmitting torque in either the first or the second rotational direction from the motor to a wheel of the aircraft through the clutch, wherein the step of engaging the clutch comprises the steps of:

rotating a driving member with the motor;

rotating a transfer member through links interconnecting the driving member and the transfer member;

applying a braking force to the transfer member to move the transfer member to engage with a driven member wherein applying the braking force to the transfer member produces a circumferential translation of the transfer member relative to the driving member and a corresponding axial displacement of the transfer member and engagement of the transfer member with the driven member;

rotating the transfer member with lug-to-lug torque transfer from the driving member, and rotating a driven member attached to the wheel with lug-to-lug torque transfer from the transfer member; and disengaging the clutch whenever the wheel rotates at a rate that exceeds the wheel speed that corresponds to the motor driving speed so that the wheel can rotate freely relative to the motor.

2. The method of claim 1 wherein the step of disengaging the clutch is performed without application of electrical power to the clutch.

3. The method of claim 1 wherein the step of disengaging the clutch comprises rotating the driven member faster than the driving member.

4. The method of claim 1 wherein the circumferential translation produces rotation of a link connecting the transfer member with the driving member so that an axial distance between a transfer-member pivot point and a driving-member pivot point is reduced whereby the transfer member is moved axially relative to the driving member.

5. The method of claim 1 wherein rotation of the wheel at a rate faster than rotation of the driving member produces the circumferential translation of the transfer member relative to the driving member and a corresponding axial displacement of the transfer member and disengagement of the transfer member from the driven member.

6. The method of claim 1 further comprising actuating a lock assembly to lock the transfer member in its disengaged position.

* * * * *